(12) United States Patent
Marchev

(10) Patent No.: US 7,814,437 B2
(45) Date of Patent: Oct. 12, 2010

(54) SYSTEM AND METHOD FOR ENHANCING FUNCTIONALITY OF JAVA CHECKBOXES WITHIN A GRAPHICAL USER INTERFACE

(75) Inventor: Nikola I. Marchev, Sofia (BG)

(73) Assignee: SAP AG, Walldorf (DE)

( * ) Notice: Subject to any disclaimer, the term of this patent is extended or adjusted under 35 U.S.C. 154(b) by 647 days.

(21) Appl. No.: 11/026,269

(22) Filed: Dec. 30, 2004

(65) Prior Publication Data

US 2006/0149777 A1 Jul. 6, 2006

(51) Int. Cl.
*G06F 3/048* (2006.01)

(52) U.S. Cl. .................................. 715/853; 715/810

(58) Field of Classification Search .................. 715/713, 715/841, 845, 853, 854, 855, 907, 765, 771, 715/810
See application file for complete search history.

(56) References Cited

U.S. PATENT DOCUMENTS

| | | | | |
|---|---|---|---|---|
| 5,857,102 A | * | 1/1999 | McChesney et al. | 713/100 |
| 7,058,928 B2 | * | 6/2006 | Wygodny et al. | 717/128 |
| 2002/0057269 A1 | * | 5/2002 | Barber et al. | 345/418 |
| 2002/0196293 A1 | * | 12/2002 | Suppan et al. | 345/853 |

* cited by examiner

*Primary Examiner*—Namitha Pillai
(74) *Attorney, Agent, or Firm*—Blakely, Sokoloff, Taylor & Zafman LLP

(57) ABSTRACT

A method is described in which the method visualizes a hierarchical representation of one or more related items and sub-items, wherein at least one of the items has a sub-item that is subservient to the item. The method displays the hierarchical representation in a tree structure, wherein at least one of the items and its sub-item are displayed as being subservient to the item by associating a symbol to represent the item as having a sub-item. The method further displays the tree structure to include a check-box for each of the items and sub-items, wherein the check-box of each of the items and sub-items contains a value.

9 Claims, 6 Drawing Sheets

⊞ – Root Node ~110

FIG. 1A
(PRIOR ART)

⊟ – Root Node ~110
├─ ⊞ – Sub-Node 1 ~120
├─ ⊞ – Sub-Node 2 ~130
└─ ☐ – Sub-Node 3 ~140

FIG. 1B
(PRIOR ART)

⊟ – Root Node ~110
├─ ⊟ – Sub-Node 1 ~120
│   ├─ ☐ – Sub-Sub-Node 1 ~121
│   ├─ ☐ – Sub-Sub-Node 2 ~122
│   └─ ☐ – Sub-Sub-Node 3 ~123
├─ ⊟ – Sub-Node 2 ~130
│   ├─ ☐ – Sub-Sub-Node 1 ~131
│   └─ ☐ – Sub-Sub-Node 2 ~132
└─ ☐ – Sub-Node 3 ~140

FIG. 1C
(PRIOR ART)

SYSTEM AND METHOD FOR ENHANCING FUNCTIONALITY OF JAVA CHECKBOXES WITHIN A GRAPHICAL USER INTERFACE

BACKGROUND

1. Field of the Invention

This invention relates generally to the field of data processing systems. More particularly, the invention relates to an improved system and method for enhancing the functionality of Java checkboxes with a graphical user interface.

2. Description of the Related Art

In order for a data processing device such as a personal computer or personal information manager ("PIM") to display a particular alphanumeric character or group of characters, the alphanumeric character(s) must be installed on the data processing device. For example, in order for a data processing device to display non-English characters, such as the "é" character ("e" with an "accent egu"), a character set, which includes those characters, must first be installed on the data processing device.

BACKGROUND

Current versions of JAVA, including JAVA 2 ENTERPRISES EDITION ("J2EE") provide for the possibility of adding graphical user interfaces ("GUI") to software applications. There are currently two sets of components or classes used in Java to provide such GUI functionality. This includes Abstract Windowing Toolkit ("AWT") and Swing. These two component sets allow for the adding of drop-down menus, buttons, radio and check boxes, text, windows, etc. One skilled in the art should already be familiar with the different components that make up a GUI. The basic functionality of each component set is to allow programmers to call individual classes that create pieces of a GUI. For example, if a programmer wishes to create a button within a GUI, they would call the Button class from AWT or the JButton class from Swing. Other information would be defined within the class such as; button name, size, location, color, function, etc. Each of the component sets mentioned above offer advantages and disadvantages over each other. Describing such differences in detail are not necessary for purposes of the present discussion.

In both AWT and Swing, there exists the ability to create hierarchal tree structures of items that may be visibly displayed within a GUI. Such a tree may include a root node and sub-nodes (a.k.a. children nodes) that branch off from the root node. If a root node contains sub-nodes, some type of image may be used to allow the user to know that sub-nodes are contained under the root node. An example might be a plus "+" sign. If an input device, such as a mouse, is used to click the plus sign, the sub-nodes may be revealed At this point, the root node may switch from a plus sign to a minus "−" sign to show that sub-nodes have been displayed. Another click to the minus sign would hide the sub-nodes and return to a plus sign. If an item does not contain a plus sign, than the item would not have sub-node below it. An example of a tree structure may be seen in FIG. 1A.

In FIG. 1A, there exists a root node 110 labeled "Root Node". In its current state, node 110 has a plus-sign next to it. This signifies that node 110 has one or more sub-nodes contained underneath it. FIG. 1B, node 110 has been opened (by clicking on the plus-sign) to reveal three sub-nodes labeled; "sub-node 1" 120, "sub-node 2" 130 and "sub-node 3" 140. Note that node 110 no longer has a plus-sign next to it, but instead reveals a minus-sign. This shows that node 110's sub-nodes have been opened. Clicking of the minus-sign may close the sub-nodes and returns to the state as shown in FIG. 1A.

Returning to FIG. 1B, node 120 and node 130 both contain a plus-sign next to their label. This further alerts the user to the existence of further sub-nodes being hidden underneath their respective parent nodes. Node 140 does not contain a plus-sign, which alerts the user that no deeper sub-nodes correspond to node 140.

FIG. 1C shows the deeper hierarchy that exists for node 120 and node 130. If the plus-signs of node 120 and node 130 were clicked, their sub-nodes would be revealed as shown in FIG. 1C. Underneath node 120, there exists three additional sub-nodes labeled; "sub-sub-node 1" 121, "sub-sub-node 2" 122 and "sub-sub-node 3" 123. Node 130 also contains two sub-nodes labeled; "sub-sub-node 1" 131 and "sub-sub-node 2" 132. At this point, there are no additional nodes hidden in deeper levels of the hierarchy. This is known through the presence of minus signs only. If there were additional plus sign(s) visible, it would be possible to click on these plus-signs to reveal lower nodes.

In both AWT and Swing, there also exists the ability to create checkboxes within a GUI. As with other programming interfaces such as MICROSOFT WINDOWS and MacOS a check box allows a user to select/deselect an option by clicking within a check box. Selecting such an option is signified by a checkmark being placed in a box. Deselection is signified by the checkbox being empty. Both AWT and Swing have different class names that would be called to create a check box within a GUI. In AWT the class is called Checkbox and in Swing the class is called JCheckBox.

It is possible to combine both check boxes and tree structures in order to create complex menus (a.k.a. checkbox-tree dialog) in which a user is able to see the physical hierarchy of different items (e.g., parent-child relationships) as well as which items have been selected through checkboxes. Such a structure also allows for a user to manually select/deselect certain items and have such changes saved within an application. An example of this can be seen in FIG. 2. FIG. 2 contains a checkbox-tree dialog 200 that represents a group of cluster nodes within a server environment. Each cluster node is a sub-node of the root node labeled "All local variables" 210. Each cluster node also contains sub-nodes as well. For example, the cluster node labeled "ID234794350" 220 contains two sub-nodes labeled "testlevel=0" 221 and "timestatisticlevel=1000" 222. Each of the items within the tree structure also has a corresponding checkbox. This is also known as a Checkbox-Tree Dialog.

In FIG. 2, the cluster node 220 is checked. Note that only one of the two sub-nodes of cluster node 220 is checked. In this example, sub-node 221 is unchecked and sub-node 222 is check. If cluster node 220 were closed (e.g., the minus-sign next to the node were clicked which would change it to a plus-sign and close the sub-nodes) there would still be a check mark in the check box. Hence a user would be unable to know whether all the sub-nodes of an item were checked or not unless they were to open cluster node 220 to verify the sub-node's content.

The cluster node labeled "ID9025051" 230 also contains two sub-nodes labeled "testlevel=22" 231 and "timestatisticlevel=220" 232. Note that both of these sub-nodes are checked. Since all of the sub-nodes of cluster node 230 are checked, the check box of cluster node 230 would also be checked. However, the check mark would differ from cluster node 220. The check mark of cluster node 230 would be completely dark in color. This signifies that all of the sub-nodes of cluster node 230 are checked. This is helpful to a user when the sub-nodes of cluster node 230 are not visible. The user would only have to see the dark check mark to know that all the sub-nodes are also checked. This differs from cluster node 220 who's check mark is grayed-out to signify that some, but not all of the sub-nodes are checked.

Lastly is the cluster node labeled "ID9025052" 240. Cluster node 240 contains two sub-nodes labeled "testlevel=13" 241 and "timestatisticlevel=15" 242. Note that neither sub-node is checked. As a result the check box for cluster node 240 is also unchecked. This is helpful to a user when the sub-nodes of cluster node 240 are not visible. The user would only have to see the unchecked check box to know that all the sub-nodes are also unchecked.

Note that when node 220 and node 230 are closed (e.g., the sub-nodes are not displayed) both of them would display a check mark. However, the underlying sub-nodes of node 220 have both a checked and unchecked item, whereas the underlying sub-nodes of node 230 are both checked. Yes a user would be unable to know whether a given closed node contains all checked sub-nodes or partially checked sub-nodes. This is a limitation of the prior art in that a user is required to manually open (by clicking the plus-sign) a closed node to see the state of the underlying sub-nodes. As mentioned above, node 220 and 230 are both checked, yet the underlying sub-node states differ.

In the prior art as shown in FIG. 2, the check box of a node containing sub-nodes may be used to manipulate the check boxes of the underlying sub-node's check boxes. For example, the check box of cluster node 230 is currently checked. The underlying sub-nodes 231 and 232 are also checked. If a user were to click on the check box of cluster node 230 the check mark would disappear, leaving the check box unchecked. Also the underlying check boxes for sub-nodes 231 and 232 would also become unchecked. Such functionality gives global control over the sub-node's check boxes. Another click of the check box of cluster node 230 would return the check marks of both cluster node 230 as well as the sub-nodes 231 and 232 and is useful for doing a global check/uncheck on sub-nodes. Such functionality can become useful when there are numerous sub-nodes under a root node. This saves the user from having to click on each individual sub-node. However the prior art approach of FIG. 2 does not allow for a user to return to a previous state if some of the underlying sub-nodes were clicked, but not all of them. A user would be required to remember the previous state of the sub-nodes and manually change them. This is another limitation of the prior art.

SUMMARY

A method is described in which the method visualizes a hierarchical representation of one or more related items and sub-items, wherein at least one of the items has a sub-item that is subservient to the item. The method displays the hierarchical representation in a tree structure, wherein at least one of the items and its sub-item are displayed as being subservient to the item by associating a symbol to represent the item as having a sub-item. The method further displays the tree structure to include a check-box for each of the items and sub-items, wherein the check-box of each of the items and sub-items contains a value.

BRIEF DESCRIPTION OF THE DRAWINGS

A better understanding of the present invention can be obtained from the following detailed description in conjunction with the following drawings, in which:

FIG. 1A illustrates a simple tree structure of the prior art showing a single root node.

FIG. 1B illustrates a simple tree structure of the prior art showing a single root node containing sub-nodes.

FIG. 1C illustrates a simple tree structure of the prior art showing a single root node containing both sub-nodes and sub-sub-nodes.

DETAILED DESCRIPTION OF PREFERRED EMBODIMENTS

Described below is a system and method for enhancing functionality of Java checkboxes within a graphical user interface.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

A computing system may be comprised of many software components or modules. Each module may contain numerous configuration settings stored in the form of Boolean values. In other words, each setting may be "on" (Boolean=TRUE) or "off" (Boolean=FALSE). In the prior art, there is no simple way to display such information to a user or developer. In order to view such configuration settings a user may be required to open individual configuration files stored in textual form, where deciphering the hierarchy between items could be difficult.

An improvement over the prior art would allow for a graphical display of the hierarchy between configuration items. The display could be presented in a summarized simple-to-read format, yet allow a user to drill down to see the underlying complex levels of hierarchy that exists amongst the items.

Figure 3A:
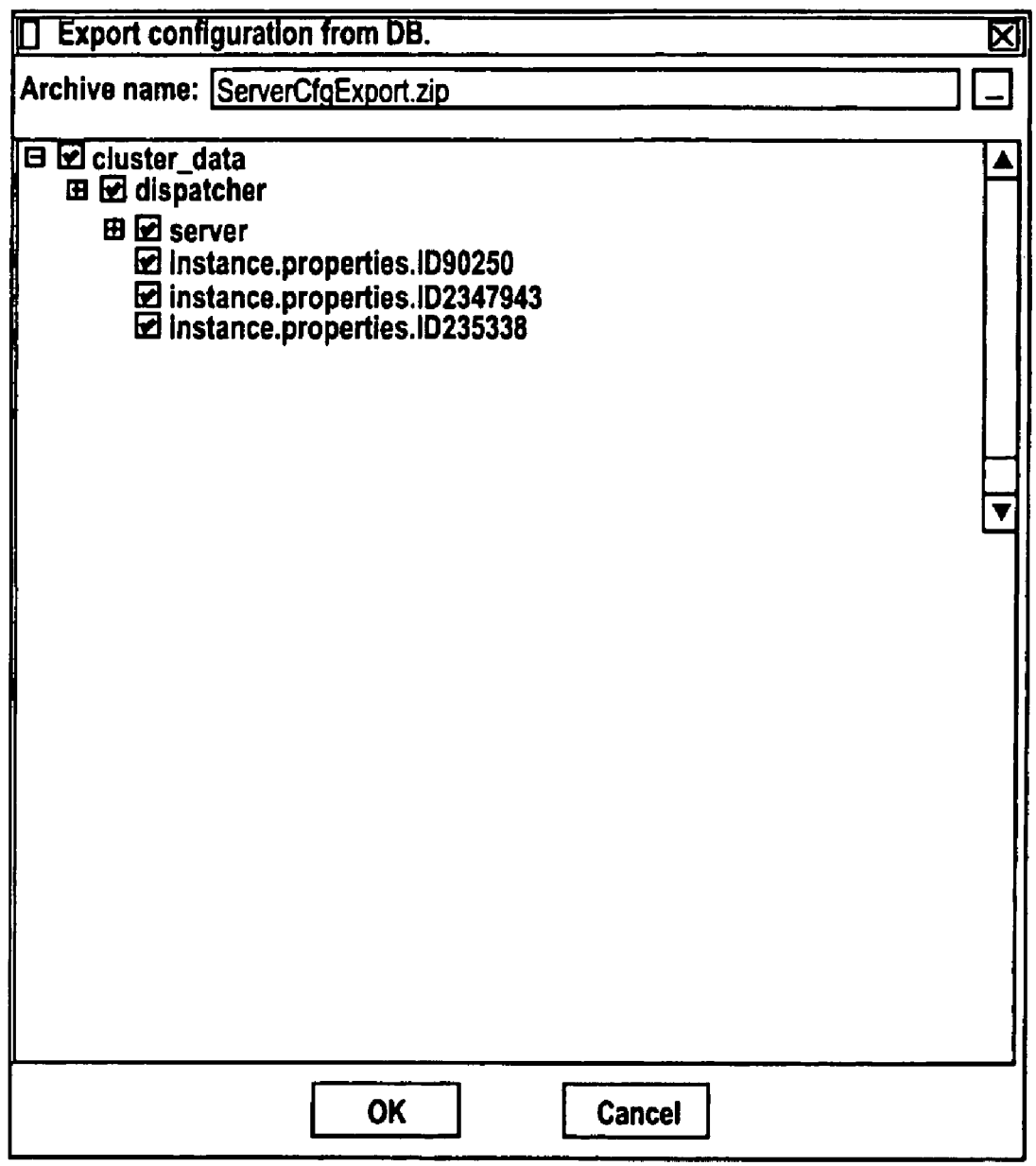
FIG. 3A illustrates a complex checkbox—tree dialog with its complex hierarchy hidden from a user.

FIG. 3A illustrates a checkbox-tree dialog that visually displays the configuration settings of a database server and its database instances. There are only a small number of items that are currently being displayed to the user, so as to keep the complexity of the configuration hidden. Yet, any of the items with a plus-sign next to it could be opened (by clicking on the plus-sign) to reveal its underlying hierarchical complexity.

Figure 3B:
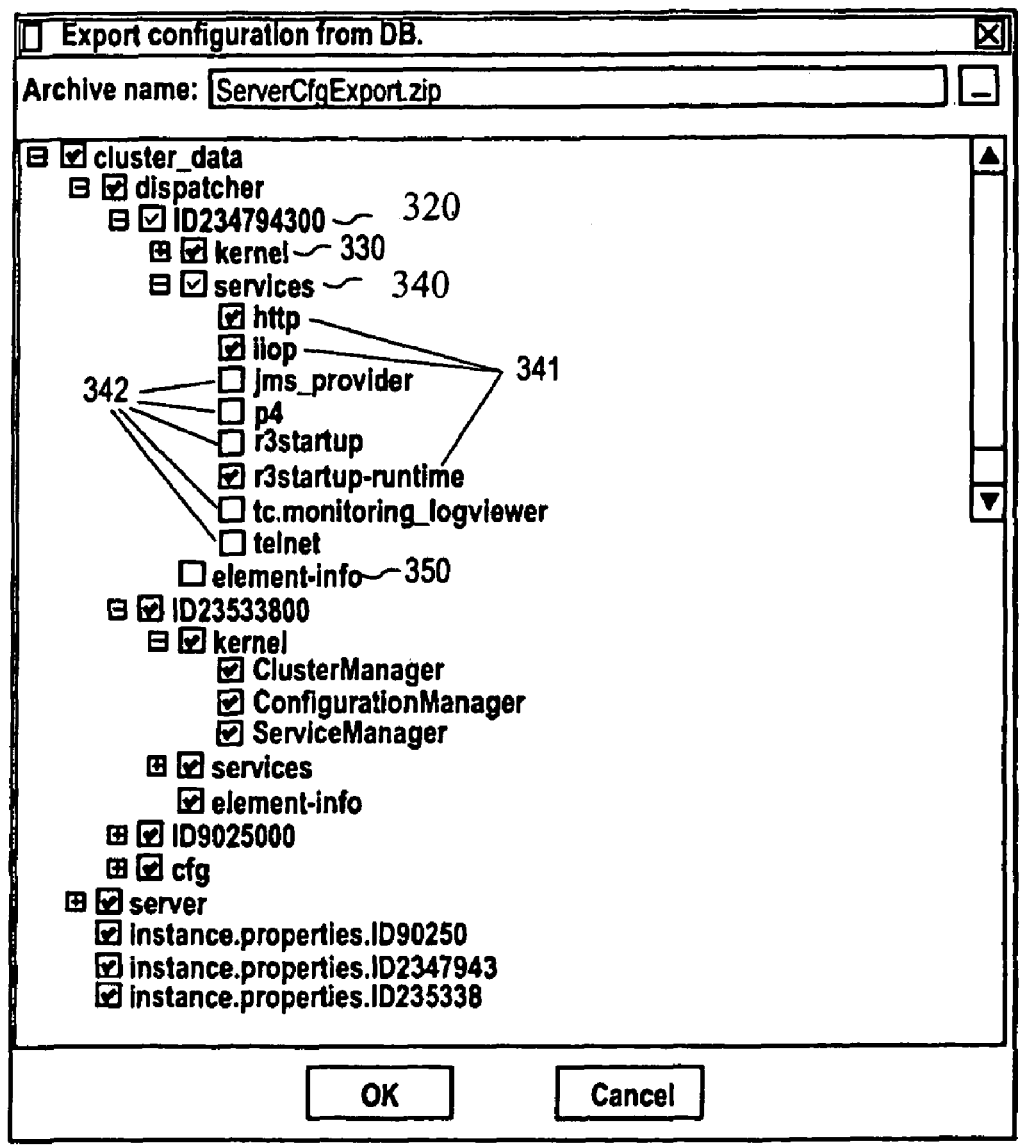
FIG. 3B illustrates a complex checkbox—tree dialog with a portion of its complex hierarchy visible to a user.

FIG. 3B illustrates a more detailed view of FIG. 3A. In this example, the item labeled "dispatcher" has been expanded (by clicking on the plus-sign associated with the item) to reveal some of the complexity of its hierarchy. As a user clicks deeper into the options, they are able visualize the existing configuration settings of the root node labeled "dispatcher". In FIG. 3B, under "dispatcher", there exists one of many cluster nodes labeled "ID234794300" 320. Cluster node 320 contains three sub-nodes labeled "kernel" 330, "services" 340 and "element-info" 350. Sub-node 340 also contains eight sub-nodes as well. Three of the sub-nodes are checked 341 and the remaining five are unchecked 342. As mentioned above, the prior art is unable to distinguish the checkbox of sub-node 340 in regards to the state of the underlying sub-nodes. Sub-node 340 would still be checked whether one of the eight underlying sub-nodes was checked or all eight were checked.

Figure 2:
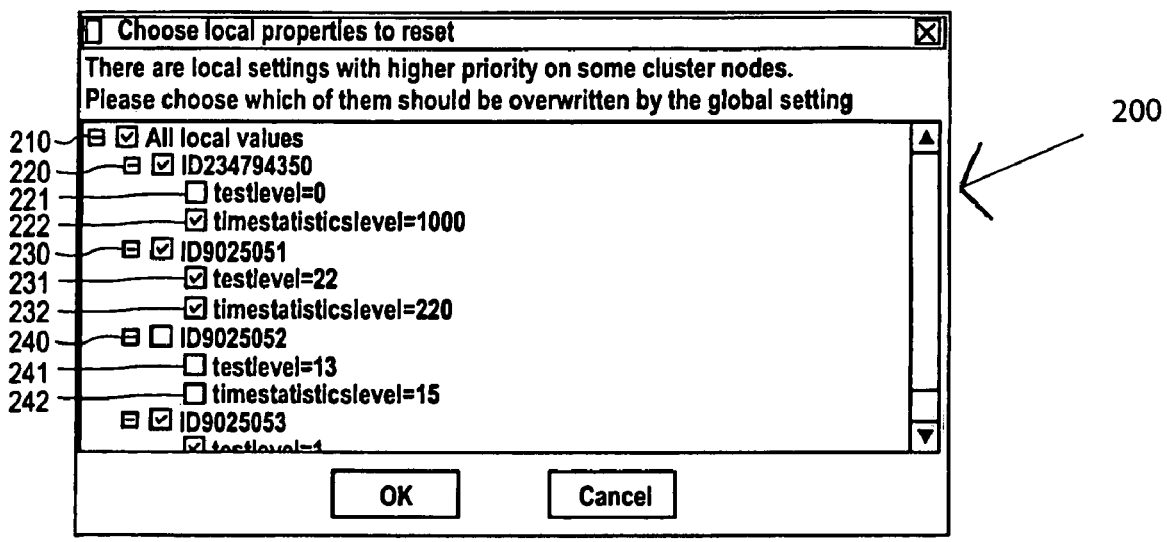
FIG. 2 illustrates a simple checkbox-tree dialog of the prior art showing a single root node with multiple sub-nodes, where each node contains a check box.

The checkbox-tree dialog of FIG. 3B adds half-check functionality to the check box of sub-node 340. Sub-node 340 remains checked, but with a grayed-out and lighter intensity check mark instead. The grayed-out checkmark would be visually different than a full check mark. This allows a user to distinguish between nodes whose underlying sub-nodes are all checked versus partially checked. If half-checked functionality were added to FIG. 2, node 220 could now be half-checked. This could visually signal to a user that at least some, but not all, of the underlying sub-nodes are checked. Node 230 would remain unchanged since all of the underlying sub-nodes are checked. Lastly, node 240 would remain unchanged since none of the underlying sub-nodes were checked.

FIG. 3B also offers additional functionality with the ability to remember the underlying state of sub-nodes. In its original state sub-node 340 is opened with eight sub-nodes underneath. Three of the sub-nodes are checked 341 and five of them are unchecked 342. If a user clicked the check box of node 340, the check mark would changed from half-checked (e.g., grayed-out) to fully checked. The eight underlying sub-nodes would also become checked. This would leave node 340 and its eight sub-nodes checked. Another click to node 340 would remove the check marks to both node 340 and the eight underlying sub-nodes 341-342. A third click to node 340 would re-check the previously checked (from the first click) sub-nodes 341, while leaving the previously unchecked sub-nodes 342 unchecked. Further, node 340 would now posses a half-check mark.

In another embodiment, the checked-tree dialogue in FIG. 3B is capable of relearning the state of sub-nodes if there are user-made changes. For example, node 340 is half-checked. Three of the sub-nodes are checked 341 and five are unchecked 342. If a user clicked the check box on node 340, the check mark would switch from half-check to fully check. All eight sub-nodes would also become checked. If a user then proceeded to uncheck one of the sub-node check boxes, the check-tree dialog would remember this change and save the current state of the sub-nodes with seven checked and one unchecked. Now if the user were to click the check box for node 340 three more times (toggling through the three states of the sub-nodes), the sub-nodes would return with 7 sub-nodes checked and one unchecked, as opposed to the previous state of three checked 341 and five unchecked 342.

In another embodiment, the order of the toggling between states could vary. For example, a first click to node 340 could remove the check mark from node 340 and all eight sub-nodes. A second click could check node 340 and all eight sub-nodes. With a third click returning to the previous state (e.g., node 340 half-checked, three of the sub-nodes checked 341 and five of the sub-nodes unchecked 342). The toggle order of the three different clicks is unimportant.

The example used in FIG. 3A and 3B is only one example of how a complex hierarchy can be visually displayed with a checkbox-tree dialog. In another embodiment, a visual display could exist to allow an administrator to backup certain portions of a database. Hence, a checkbox-tree dialog might display the hierarchy that exists between the instances of a database, its tables, fields and individual records. An administrator could select (by clicking the checkbox for each corresponding item) certain portions of the database to be backup up.

In another embodiment, the installation of a software package could visually present a user with aspects of the installation procedure. A checkbox-tree dialog may display the hierarchy of different components that may be installed as well as lower-level details of each component. A user could check or uncheck certain components that he/she wishes to install.

Figure 4:
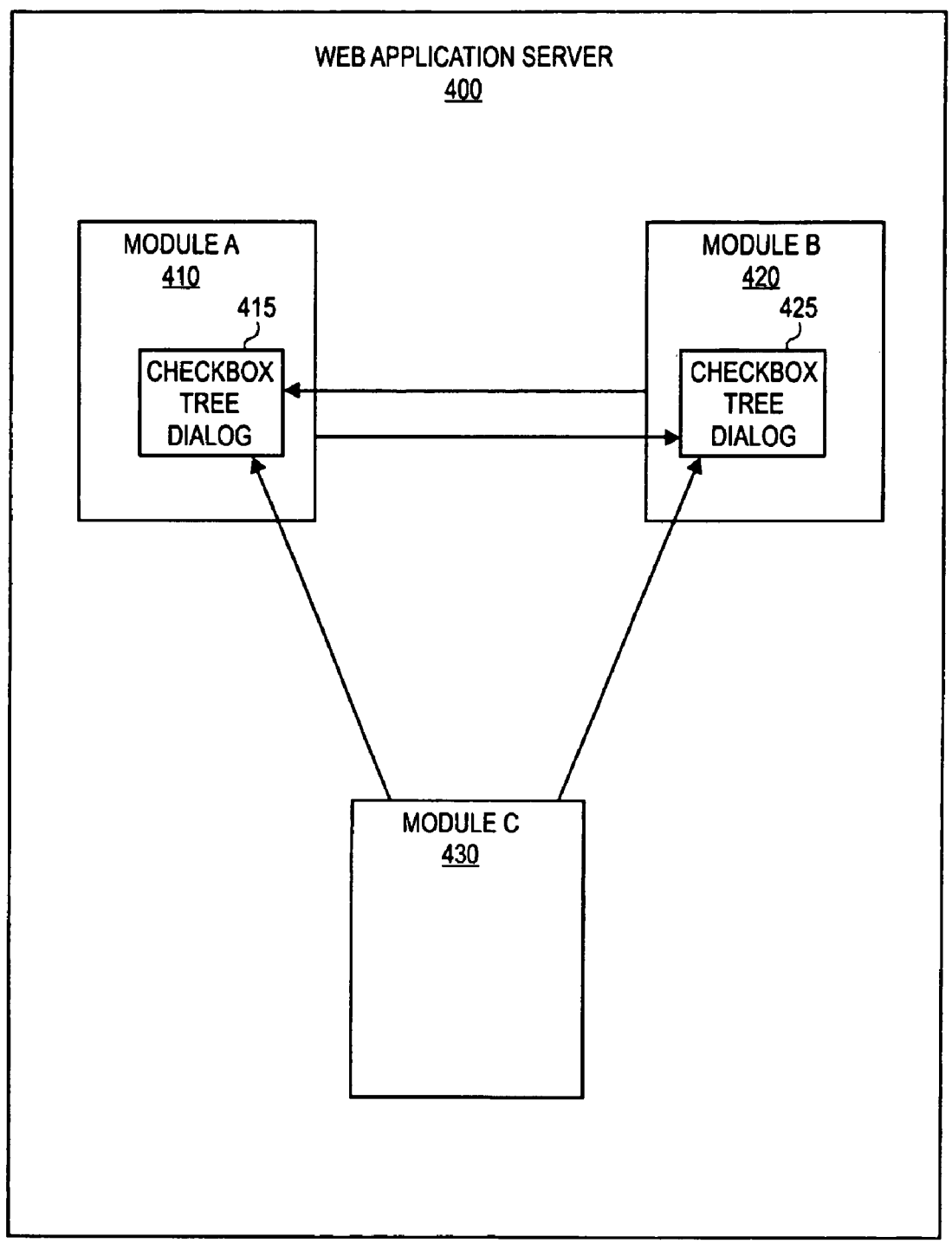
FIG. 4 illustrates a module within an application server that contains a complex checkbox—tree dialog that is accessible by other modules with the application server.

Another important feature is accessibility of a check-box-tree dialog by other components. If the configuration settings of a module within a web application server can be visually displayed in a checkbox-tree dialog, it would be useful to allow other modules or components within the web application server to access the checkbox-tree dialog and its settings. FIG. 4 illustrates this example. In FIG. 4 there exists a Web Application Server 400, which comprises three modules: Module A 410, Module B 420, and Module C 430. Module A 410 has a checkbox-tree dialog 415 that contains a complex hierarchy of configuration settings of Module A 410. Both Module B 420 and Module C 430 are able to access the information contained in checkbox-tree dialog 415. Further, Module B 420 has a checkbox-tree dialog 425 that contains a complex hierarchy of configuration settings of Module B 420. Both Module A 410 and Module C 430 are able to access the information contained in checkbox-tree dialog 425.

In another embodiment, a checkbox-tree dialog may also allow its information to be accessed by external applications and not just different modules within the same application. For example, checkbox-tree dialog 415 is accessible by Module B 420 and Module C 430. However it may also be accessible by an external database server or mail server (not shown).

The server may be JAVA 2 ENTERPRISES EDITION ("J2EE") server nodes, which support ENTERPRISE JAVA BEAN ("EJB") components and EJB containers (at the business layer) and Servlets and JAVA SERVER PAGES ("JSP") (at the presentation layer). Of course, other embodiments may be implemented in the context of various different software platforms including, by way of example, MICROSOFT-.NET, WINDOWS/NT MICROSOFT TRANSACTION SERVER (MTS), the ADVANCED BUSINESS APPLICATION PROGRAMMING ("ABAP") platforms developed by SAP AG and comparable platforms.

Processes taught by the discussion above may be performed with program code such as machine-executable instructions, which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, Compact Disc Read Only Memory ("CD-ROMs"). Digital Video Disc ROM ("DVD" ROMs), Erasable Programmable ROM ("EPROMs"), Electrically Erasable Programmable Read Only Memory ("EEPROMs"), magnetic or optical cards or other type of machine-readable media suitable for storing electronic instructions. Program code may also be down-loaded from a remote computer (e.g., a server) to a requesting computer (e.g., a client) by way of data signals embodied in a propagation medium (e.g., via a communication link (e.g., a network connection)).

Figure 5:
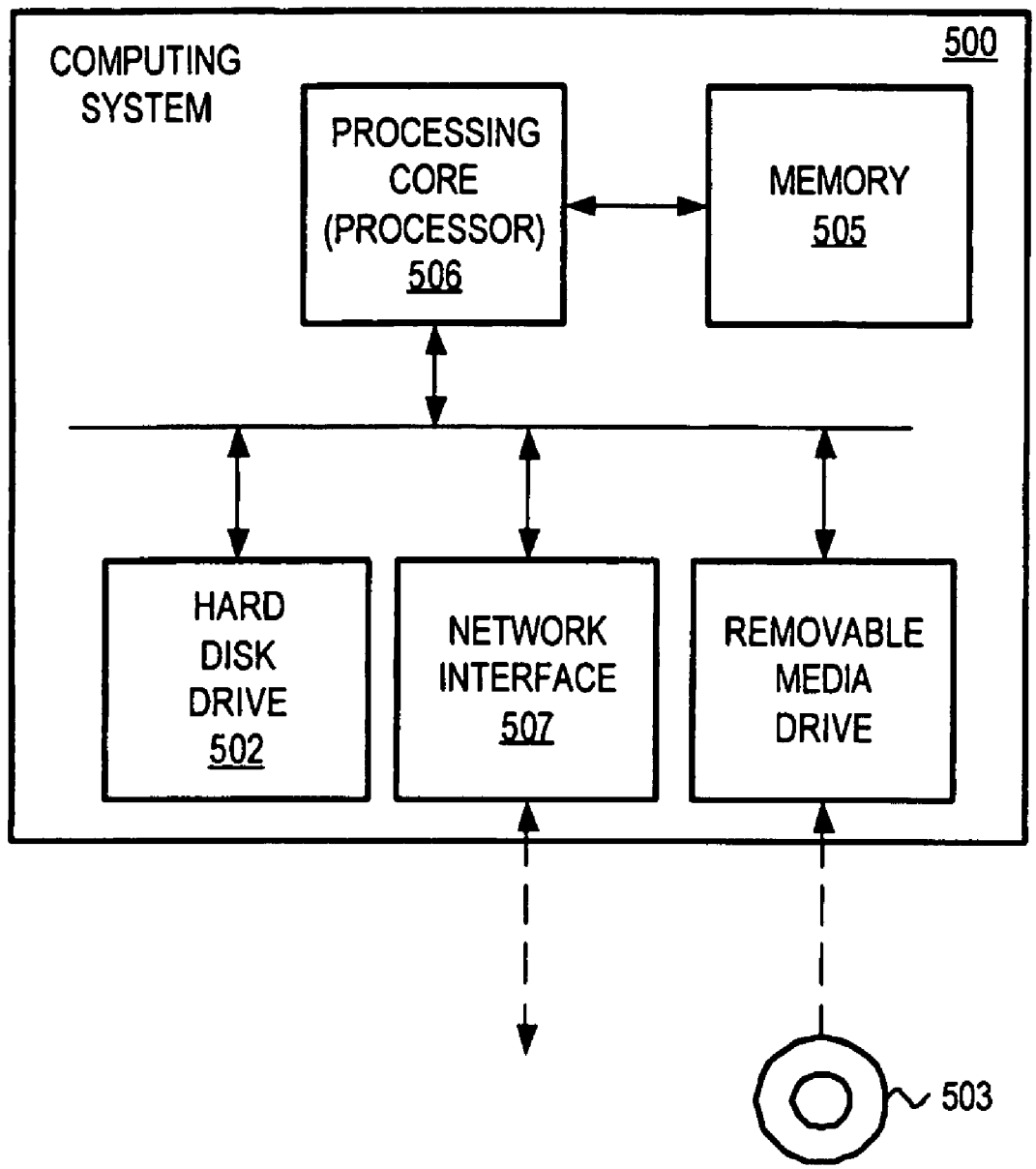
FIG. 5 illustrates a block diagram of a computing system that can execute program code stored by an article of manufacture.

FIG. 5 illustrates a block diagram of a computing system 500 that can execute program code stored by an article of manufacture. It is important to recognize that the computing system block diagram of FIG. 5 is just one of various computing system architectures. The applicable article of manufacture may include one or more fixed components (such as a hard disk drive 502 or memory 505) and/or various movable components such as a CD ROM 503, a compact disc, a magnetic tape, etc. In order to execute the program code, typically instructions of the program code are loaded into the Random Access Memory (RAM) 505; and, the processing core 506 then executes the instructions. The processing core may include one or more processors and a memory controller function. A virtual machine or "interpreter" (e.g., a JAVA Virtual Machine) may run on top of the processing core (architecturally speaking) in order to convert abstract code (e.g., JAVA bytecode) into instructions that are understandable to the specific processor(s) of the processing core 506.

It is believed that processes taught by the discussion above can be practiced within various software environments such as, for example, object-oriented and non-object-oriented programming environments, JAVA based environments (such as a JAVA 2 ENTERPRISE EDITION (J2EE) environment or environments defined by other releases of the JAVA standard), or other environments (e.g., a .NET environment, a WINDOWS/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    displaying a hierarchical representation of one or more related items and sub-items in a tree structure, wherein at least an item of said items has a sub-item that is displayed as being subservient to said item by associating a symbol to represent said item as having said subservient sub-item; and
    further displaying said tree structure to include a check-box associated with and displayed next to each of said items and sub-items, wherein said check-box of each of said items and sub-items is checked, unchecked, or half-checked indicating said items and sub-items as being opened, closed, or partially opened, respectively, said tree structure having check-boxes to eliminate manual opening of each said items and sub-items to determine their corresponding status, said check-boxes having a check-box corresponding to an item of said items, said check-box when checked results in checking of sub-items associated with said item, said check-box when unchecked results in unchecking of said associated sub-items, and said check-box when half-checked results in one or more of associated sub-items being checked and remaining associated sub-items being unchecked, wherein a checked/unchecked status of each of said associated sub-items relating to said check-box being half-checked is preserved and said preserved status of each associated sub-item is re-displayed each time said check-box is half-checked; and
    associating Boolean values to each of said items and sub-items via one or more modules, the module having the Boolean values representing configuration settings of said items and sub-items to facilitate conversion of textual representation of said items and sub-items into the hierarchical representation of said items and sub-items in the tree structure.

2. The method of claim 1, wherein the Boolean values comprise a TRUE value representing a configuration setting being on, and a FALSE value representing the configuration setting being off.

3. The method of claim 1, further comprising simplified displaying of said hierarchical representation of the tree structure via a Graphical User Interface (GUI) device.

4. A computing system comprising a virtual machine, a plurality of processors, and instructions disposed on a storage medium, said instructions capable of being interpreted by said virtual machine at an application server, the application server to:
    display a hierarchical representation of one or more related items and sub-items in a tree structure, wherein at least an item of said items has a sub-item that is displayed as being subservient to said item by associating a symbol to represent said item as having said subservient sub-item; and
    further display said tree structure to include a check-box associated with and displayed next to each of said items and sub-items, wherein said check-box of each of said items and sub-items is checked, unchecked, or half-checked indicating said items and sub-items is being opened, closed, or partially opened, respectively, said tree structure having check-boxes to eliminate manual opening of each said items and sub-items to determine their corresponding status, said check-boxes having a check-box corresponding to an item of said items, said check-box when checked results in checking of sub-items associated with said item, said check-box when unchecked results in unchecking of said associated sub-items, and said check-box when half-checked results in one or more of associated sub-items being checked and remaining associated sub-items being unchecked, wherein a checked/unchecked status of each of said associated sub-items relating to said check-box being half-checked is preserved and said preserved status of each associated sub-item is re-displayed each time said check-box is half-checked; and
    associate Boolean values to each of said items and sub-items via one or more modules, the module having the Boolean values representing configuration settings of said items and sub-items to facilitate conversion of textual representation of said items and sub-items into the hierarchical representation of said items and sub-items in the tree structure.

5. The system of claim 4, wherein the Boolean values comprise a TRUE value representing a configuration setting being on, and a FALSE value representing the configuration setting being off.

6. The system of claim 4, further comprising simplified displaying of said hierarchical representation of the tree structure via a Graphical User Interface (GUI) device.

7. An article of manufacture including program code which, when executed, causes a machine to:
    display a hierarchical representation of one or more related items and sub-items in a tree structure, wherein at least an item of said items has a sub-item that is displayed as being subservient to said item by associating a symbol to represent said item as having said subservient sub-item; and further display said tree structure to include a check-box associated with and displayed next to each of said items and sub-items, wherein said check-box of each of said items and sub-items is checked, unchecked, or half-checked indicating said items and sub-items as being opened, closed, or partially opened, respectively, said tree structure having check-boxes to eliminate manual opening of each said items and sub-items to determine their corresponding status, said check-boxes having a check-box corresponding to an item of said items, said check-box when checked results in checking of sub-items associated with said item, said check-box when unchecked results in unchecking of said associated sub-items, and said check-box when half-checked results in one or more of associated sub-items being checked and remaining associated sub-items being unchecked, wherein a checked/unchecked status of each of said associated sub-items relating to said check-box being half-checked is preserved and said preserved status of each associated sub-item is re-displayed each time said check-box is half-checked; and associate Boolean values to each of said items and sub-items via one or more modules, the module having the Boolean values representing configuration settings of said items and sub-items to facilitate conversion of textual representation of said items and sub-items into the hierarchical representation of said items and sub-items in the tree structure.

8. The article of manufacture of claim 7, wherein the Boolean values comprise a TRUE value representing a configuration setting being on, and a FALSE value representing the configuration setting being off.

9. The article of manufacture of claim 7, further comprising simplified displaying of said hierarchical representation of the tree structure via a Graphical User Interface (GUI) device.

* * * * *